(12) United States Patent
Lohrey et al.

(10) Patent No.: US 6,675,553 B2
(45) Date of Patent: Jan. 13, 2004

(54) METHOD AND DEVICE FOR STACKING AND PACKING INFUSION BAGS

(75) Inventors: Wilhelm Lohrey, Meerbusch (DE); Stefan Lambertz, Hürth (DE); Wolfgang Groth, Wegberg (DE)

(73) Assignee: Teepack Spezialmaschinen GmbH & Co. KG (DE)

( * ) Notice: Subject to any disclaimer, the term of this patent is extended or adjusted under 35 U.S.C. 154(b) by 45 days.

(21) Appl. No.: 09/963,813

(22) Filed: Sep. 26, 2001

(65) Prior Publication Data

US 2002/0134053 A1 Sep. 26, 2002

(30) Foreign Application Priority Data

Feb. 9, 2001 (EP) .............................. 01103058

(51) Int. Cl.⁷ .............................. B65B 61/14
(52) U.S. Cl. .................. 53/134.2; 53/247; 53/413; 53/541; 414/790.4; 414/795; 493/223; 493/236; 493/238
(58) Field of Search .................. 53/513, 520, 540, 53/541, 247, 413, 134.2; 225/98, 99, 103, 104, 105; 414/795, 790.3, 790.4; 493/235, 236, 223, 224, 230, 233, 238

(56) References Cited

U.S. PATENT DOCUMENTS

| | | | | | |
|---|---|---|---|---|---|
| 3,192,683 | A | * | 7/1965 | Grafingholt et al. | 53/134.2 |
| 3,445,980 | A | * | 5/1969 | Salomon | 53/448 |
| 3,712,487 | A | * | 1/1973 | Eberle | 414/795.1 |
| 3,774,369 | A | * | 11/1973 | Klar | 53/134.2 |
| 4,829,742 | A | * | 5/1989 | Romagnoli | 53/134.2 |
| 4,957,409 | A | * | 9/1990 | Fukao et al. | 414/788.4 |
| 4,977,728 | A | * | 12/1990 | Rambold | 53/567 |
| 5,595,280 | A | * | 1/1997 | Spatafora | 198/429 |

FOREIGN PATENT DOCUMENTS

EP          0 962 390 A1     12/1999

* cited by examiner

Primary Examiner—Rinaldi I. Rada
Assistant Examiner—Thanh Truong
(74) Attorney, Agent, or Firm—Cantor Colburn LLP

(57) ABSTRACT

This invention concerns a method and a device for stacking and packing groups of infusion bags, especially for making tea, whereby in continuous production infusion bags arranged one after another in a series in a strand are separated, their speed of movement is reduced and they are put in a position suitable for making a stack, whereby the infusion bags are arranged one after another in such a way that they at least partly overlap in their subsequent direction of movement.

13 Claims, 2 Drawing Sheets

METHOD AND DEVICE FOR STACKING AND PACKING INFUSION BAGS

FIELD OF THE INVENTION

This invention concerns a method of packing infusion bags in groups, especially for making tea, which are assembled in a predetermined number in a series of infusion bags and inserted into a packing container prepared in a predetermined position. The invention also concerns a device for implementing the method.

DESCRIPTION OF RELATED ART

Methods and devices for continuous production of infusion bags and corresponding infusion bags are known in many embodiments. In one of the known embodiments, individual quantities of a substance to be extracted are deposited on a strip of filter paper and then a tube is formed that is divided into individual chambers closed on all sides, each containing a quantity of the substance. The tube is formed by overlapping and folding the strip of filter paper and closing it by means of a longitudinal seam or by adding another strip of filter paper and making two longitudinal seams. This forms a strand of chambers, which consists of continuous chambers, one after another, closed by a crosswise seam and containing a quantity of substance; the crosswise seam is also the back seam of one chamber and the front seam of the next one, and includes a perforation between the two seams where the chambers are separated during the process. The isolated chambers are then attached to a carrier material, which is used for handling and suspending the infusion bag. To make the carrier material forming the hanger of the infusion bag, a crosswise perforated strand of carrier material whose sections of carrier material form the hanger of the infusion bag in continuous production is used.

SUMMARY OF THE INVENTION

It is known how to pack and sell a predetermined number of infusion bags assembled in a series of bags, especially for making tea, in groups by inserting them in packing containers, especially boxes. Besides the continuous production of the infusion bag described above as an example, their packing should also be fully automatic. Due to the flux characteristics of the quantities of substance with which the infusion bags are filled, they preferably collect in the back part of the infusion bag in the direction of movement, so that the individual infusion bag, seen over the surface, has a different thickness, especially at high production capacity in the range of production from 800 to 1,500 infusion bags per minute. Overall, this produces a series of infusion bags with different sealed and thick zones, which runs counter to a basic interest in the smallest possible packing containers. It is also necessary to avoid an arrangement of infusion bags pressed too tightly in the packing containers, since otherwise they can be damaged when taken out.

With the known methods and devices, when stacking and packing infusion bags in groups, especially those for making tea, it is not possible to guarantee a high production rate and at the same time good equalization and compression of the tea packed in the bags, and so guarantee the possibilities of reducing the size of the package.

In view of this state of the art, the problem of the invention is to improve a method of stacking and packing infusion bags in groups, especially those for making tea, of the type mentioned at the beginning, in such a way that at high production capacities, uniform distribution and good compression of the quantities of substance with which the infusion bags are filled is possible over the entire surface of the infusion bag without pressing them down. It should also permit simple, reliable and especially damage-free stacking and packing of infusion bags at high production speeds. And the invention should also provide a technically simplified device for implementing the method.

The problem in the invention is solved with a method of the type mentioned at the beginning in which infusion bags arranged in a strand one after another in series in continuous production are separated, their speed of movement is reduced and they are put in a position suitable for making a stack, and the infusion bags are arranged one after another in such a way that they at least partly overlap in their subsequent direction of movement.

The invention is based on the knowledge of how to change the speed of movement of the infusion bags one after another in a strand in continuous production by changing the arrangement of the infusion bags. According to the invention, the distance between infusion bags one after another in a strand in continuous production is reduced by an overlapping arrangement of the infusion bags. According to the invention, at least two infusion bags are arranged on the length of an infusion bag by making a stack in the direction of movement due to the overlapping arrangement. The associated reduction in distance between infusion bags brings with it a reduction in speed, so the infusion bags move from continuous production to stacking and packing in groups with no noteworthy shock.

Advantageously, to separate an infusion bag from the strand, the continuously moved strand is grasped when the infusion bag to be separated is in a predetermined position, preferably near a perforation made in the side of the strand, and is accelerated in the direction of movement of the strand in such a way that the infusion bag is separated from the strand by the relative movement. Advantageously, the infusion bags in a crosswise perforated strand in continuous production are fed to a continually turning wheel, which has tongs placed on the side of the wheel that can move in relation to the wheel to grasp the longitudinal sides of the infusion bag to be separated from the strand at a predetermined position near the perforation, and the infusion bag can be separated by relative movement of the tongs to the wheel. Advantageously, the tongs can swivel in the direction in which the wheel turns and can accelerate to produce the relative movement in that direction. Advantageously, the tongs are accelerated by curve control.

To make a stack, in another advantageous embodiment of the invention, the separated infusion bags are deposited on the outer periphery of a continually turning partitioned wheel that has pouch-like receptacles for the infusion bags. The arrangement of infusion bags to one another is changed by the partitioned wheel so that the distance between them and hence their speed of movement is reduced. To adjust the speed of the infusion bags from the tonged wheel used for separating them to the partitioned wheel, the tong movement is returned after acceleration and the infusion bag speed is reduced, preferably via curve control. The speed is adjusted in such a way that the transfer of the infusion bags from the tonged wheel to the partitioned wheel takes place with no noteworthy shock, so good equalization and compression of the quantities of substance packed in the infusion bags is maintained.

Advantageously, the infusion bags are held in the pouch-like receptacles of the partitioned wheel by suction. This results in another homogenization of the quantities of substance contained in the infusion bags, and the infusion bags are kept safe at the same time.

Advantageously, the infusion bags are moved by turning the partitioned wheel on a rail support arranged on the side of the partitioned wheel, by means of which the infusion bags are automatically taken out of the receptacles on the partitioned wheel at defined distance from one another and stacked in a shaft. The infusion bags taken out of the receptacles in the partitioned wheel are stacked in the shaft by means of spiral conveyors arranged in the area near the longitudinal sides of the infusion bags. The spiral conveyors are used to maintain a certain distance between the individual infusion bags. To support the alignment of the quantities of substance in the infusion bags, shaking devices are advantageously provided, which set the stacked infusion bags in shaking motions to align the quantities of substance. A distance is produced between the infusion bags to be stacked by the spiral conveyors, and it is used in the rest of the process to assemble a predetermined number of infusion bags into a series of infusion bags. To move the infusion bags out of the partitioned wheel area, the spiral conveyor has a greater pitch in the area near the partitioned wheel.

To assemble a predetermined number of infusion bags into a series of infusion bags, a feeder is used to grasp infusion bags stacked some distance apart in the shaft by means of the spiral conveyors; it engages in the shaft, depending on the predetermined number of infusion bags to be packed, and inserts the assembled series of infusion bags in a packing container provided in a predetermined position or positions them accordingly. The feeder advantageously makes a continually rotating motion or a linear oscillating motion. In one embodiment of the invention, at least one feeder is arranged on a continually circulating belt or chain drive, with which a predetermined number of infusion bags assembled in a series of infusion bags is taken out of the shaft in a continually rotating movement as the feeder circulates and is fed to a packing container placed in a predetermined position. The assembled series of infusion bags is inserted into the packing container in another advantageous embodiment of the invention with the motion of the feeder or with a separate pusher.

BRIEF DESCRIPTION OF THE DRAWINGS

Other details, features and advantages of the invention will be described in greater detail below using the examples of embodiment shown in the figures.

DETAILED DESCRIPTION OF THE PREFERRED EMBODIMENTS

Figure 1:
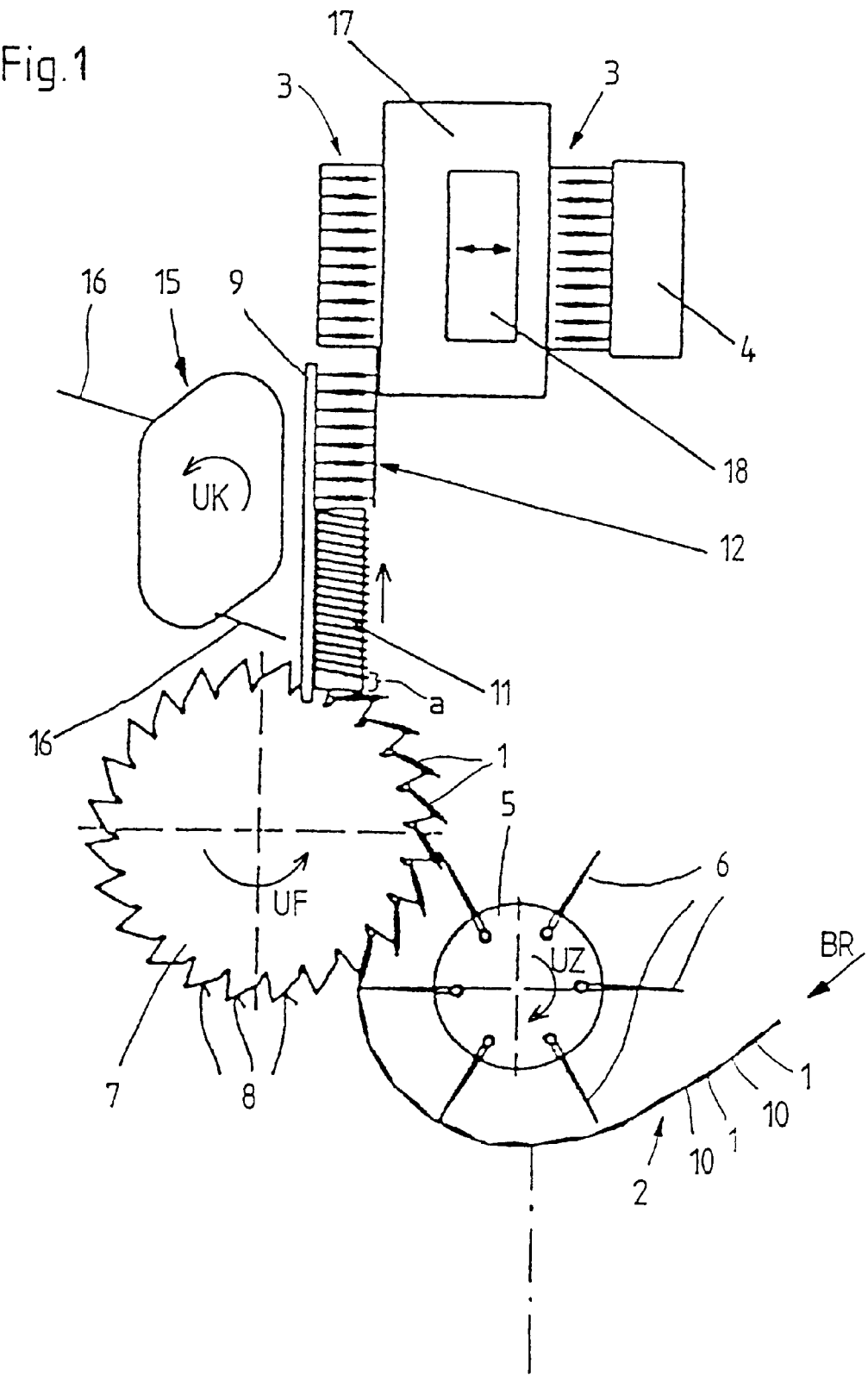
FIG. 1 shows a diagram of a device for implementing the method in the invention and FIG. 2 shows in detail part of the device in FIG. 1 in a schematic perspective view.

FIG. 1 shows a diagram of a device for stacking and packing infusion bags 1 for making tea in groups. The infusion bags 1 consist of a hanger made of a strip of carrier material, which is provided on both sides with chambers closed on all sides, containing at least a quantity of substance and connected to the hanger. In continuous production, the infusion bags 1 in the form of a strand of infusion bags 2, are continually fed in groups to the stacking and packing device. The strand of infusion bags 2 consists of infusion bags 1 arranged one after another in a series, which are connected to one another by strip-like carrier material used for handling and hanging the infusion bag 1.

To separate the infusion bag, the strip-like carrier material is cross-perforated in the area where it is connected to the chambers of the infusion bag 1.

In the continuous production of the infusion bag 1, the strand of infusion bags 2 is fed to a continually turning tonged wheel 5, whereby the carrier material forming the hanger of an infusion bag 1 of the strand 2 of infusion bags is grasped by tongs 6 arranged on the tonged wheel 5 and is pulled apart by the relative movement of the tongs 6 to the tonged wheel 5 toward the strand of infusion bags at the crosswise perforation 10. The tongs 6 grasp the carrier material of the infusion bag 1 in the area where the chambers of the infusion bag 1 are connected to the carrier material. To separate the infusion bag 1 from the strand 2 of infusion bags, the front tongs in the direction UZ in which the tonged wheel 5 turns are accelerated to produce a relative movement in the turning direction UZ, when the next tongs 6 in the turning direction UZ have grasped the carrier material of the next infusion bag 1. Both the production of the relative movement and the grasping of the tongs 6 is controlled over separate stretches of curves coordinated with one another by the tonged wheel 5.

The infusion bags 1 separated in this way are deposited by the tongs 6 of the wheel 5 in pouch-like receptacles 8 on the outer periphery of a partitioned wheel 7. Here, the infusion bags 1 in the pouch-like receptacles 8 of the partitioned wheel 7 are held and supported by suction using low pressure. To adjust the speed of the infusion bag 1 from the tonged wheel 5 to the partitioned wheel 7, the movement of the tongs 6, after acceleration in the direction UZ in which the tonged wheel 5 turns, is returned by curve control, and the speed of the infusion bag 1 is reduced in such a way that the transfer takes place with no noteworthy shock.

Combining the toothed wheel and the partitioned wheel reduces the speed of movement of the infusion bag 1, and the infusion bag 1 is placed in a position suitable for making a stack. Here, the infusion bags 1 arranged one after another in a series in continuous high-speed production are separated from the strand 2 of infusion bags and are arranged one after another in the receptacles 8 of the partitioned wheel 7 in such a way that the infusion bags 1 overlap at least partly in their subsequent direction of movement. The subsequent direction of movement of the infusion bags 1 corresponds to the direction UF in which the partitioned wheel 7 turns. By combining the tonged wheel 5 and the partitioned wheel 7, the distance between the infusion bags 1 is reduced and the speed of the infusion bags 1 is reduced by the partitioned wheel 7. Due to the pouch-like receptacles 8 for the infusion bags 1 on the outer periphery of the partitioned wheel 7, the infusion bags 1 are basically radial. Thus, more infusion bags can be accepted over the periphery of the partitioned wheel than in the arrangement where the infusion bags 1 are one after another in a series corresponding to the strand 2 of infusion bags. The speed of the partitioned wheel 7 can thus be reduced, since several infusion bags 1 can arrive at the same time, depending on the overlap. The reduced speed guarantees good equalization and compression of the quantities of substance packed in the infusion bags.

When the infusion bags 1 are transferred from the tonged wheel 5 to the partitioned wheel 7, the pouch-like receptacles on the outer periphery of the partitioned wheel 7 provide a support for the infusion bags 1, on which the infusion bags 1 can be deposited practically with no noteworthy shock by the return movement of the tongs 6 on the tonged wheel 5. The return movement of the tongs 6 of the tonged wheel 5 thus adjusts the speed of the infusion bag to the turning speed of the partitioned wheel 7, which is less than the speed of the strand of infusion bags 2. This ensures that the quantities of substance inside the chambers of the infusion bags 1 remain evenly distributed.

Figure 2:
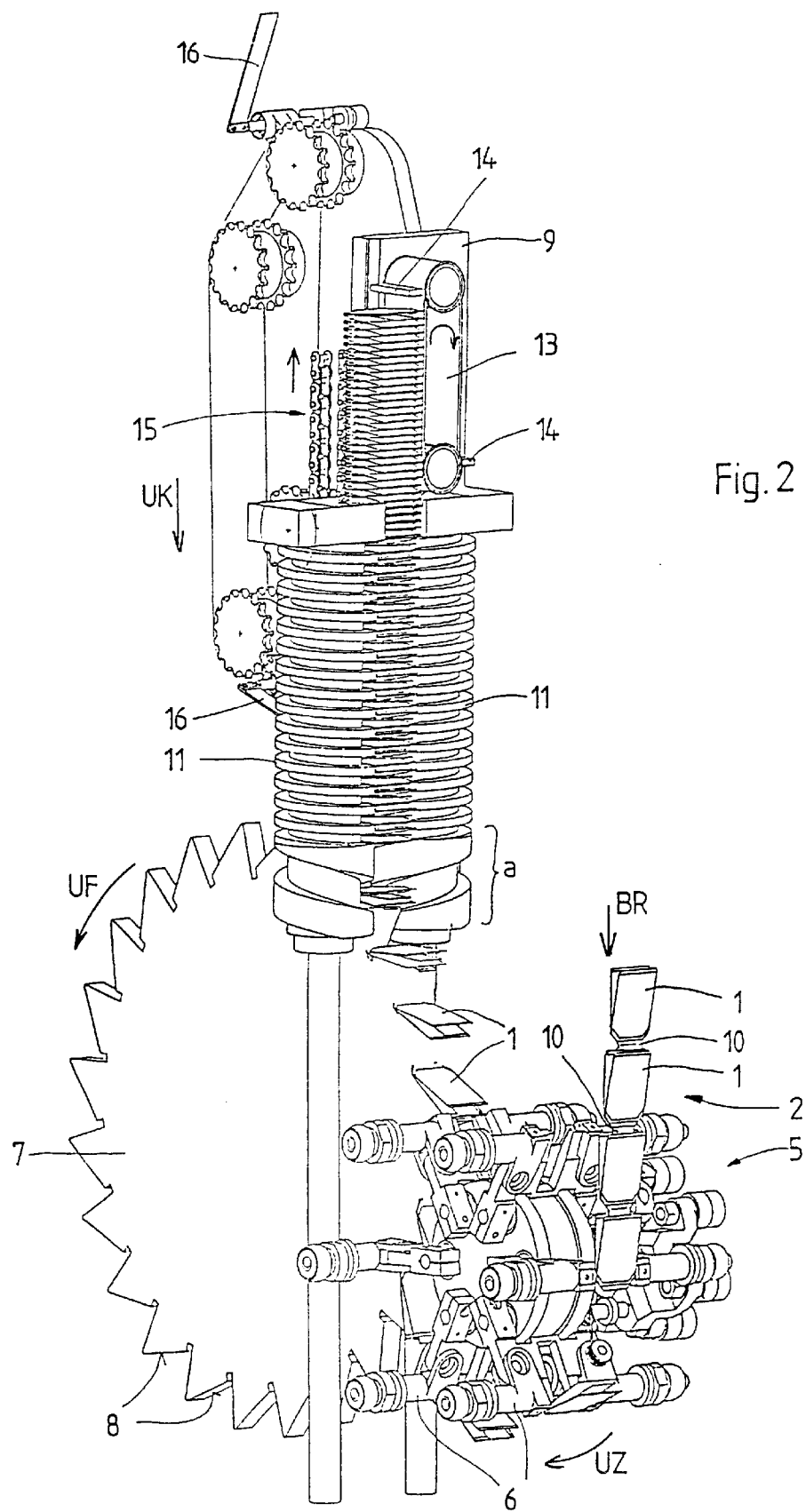

When the partitioned wheel 7 turns, the infusion bags 1 are taken out of the receptacles 8 on the partitioned wheel 7 by a rail support 9 arranged on both sides of the partitioned wheel 7. Because of the slow speed of the partitioned wheel 7, the infusion bags 1 are held back with no noteworthy shock during the turning of the partitioned wheel 7 by the rail support 9. Perpendicular to the turning direction UF of the partitioned wheel 7, spiral conveyors 11 are arranged on both sides of the partitioned wheel 7 in the lower part of the rail support 9, and they continually move the infusion bags 1 forward. The spiral conveyors 11 have a greater pitch for this in the area marked a in FIGS. 1 and 2, to convey the infusion bags 1 as quickly as possible from the feed area of the partitioned wheel 7.

The infusion bags 1 are stacked in a shaft 12 along the rail support 9 by the spiral conveyors 11. The side walls of the shaft 12 here are designed with cam strips 13 with cams 14 arranged via the rail support 9 over the spiral conveyors 11, which are controlled by servo motors.

In the turning direction UF behind the rail support 9, feeders 16 are arranged on a circulating chain drive 15, and they engage through a gap in the rail support 9 between the infusion bags 1 transported by the spiral conveyors 11 when the chain drive 15 turns.

The chain drive 15 is controlled in such a way that the feeders 16 assemble the infusion bags in a predetermined number in the shaft 12. The feeders 16 are moved by the chain drive 15 parallel to the infusion bags 1 stacked by means of the spiral conveyors 11 at the same speed. At a predetermined number of infusion bags 1, which is detected by sensor devices, the feeder 16 moved by the chain drive 15, controlled by means of servo motors, engages in the stacked infusion bags and thus assembles a predetermined number of infusion bags in a series 3. After the feeder 16 engages in the stack of infusion bags 1, the chain drive 15 is accelerated, so that the feeder 16 feeds a predetermined number of infusion bags in a series to a cartridge 17 with a conveyor belt, from which the series of infusion bags 3, with a predetermined number of infusion bags 1, is pushed into a packing container 4 by a pusher 18. The cam belts 13 are controlled by means of servo motors in such a way that when the feeder 16 is engaged in the stack of infusion bags 1 arranged in the shaft 12, the cam belts 13 are accelerated to prevent the cam 14 of the cam belts 13 from hindering the series 3 of infusion bags with infusion bags 1 being put in the packing position by the feeder 16 as it moves. At the same time, the cams 14 of the cam belts 13 on the shaft 12 make it easier to stack the infusion bags 1 in the shaft 12 since the cams 14 are carried along evenly with the growing stack. This prevents the infusion bags 1 in the shaft 12 from tilting.

The example of embodiment shown in the figures is used only to explain the invention and is not limited to it. Thus, alternatively, the packing container 4 can also be filled from the longitudinal side and the feeder 16 can grasp a series 3 of infusion bags with a predetermined number of infusion bags 1 in an oscillating movement engaging in the shaft 12 and feed it to a pushing device.

| Reference List | |
|---|---|
| 1 | infusion bag |
| 2 | strand of infusion bags |
| 3 | series of infusion bags |
| 4 | packing container |
| 5 | tonged wheel |
| 6 | tongs |
| 7 | partitioned wheel |
| 8 | receptacle |
| 9 | rail support |
| 10 | crosswise perforation |
| 11 | spiral conveyor |
| 12 | shaft |
| 13 | cam belt |
| 14 | cam |
| 15 | chain drive |
| 16 | feeder |
| 17 | cartridge |
| 18 | pusher |
| a | area of greater pitch |
| UZ | direction in which tonged wheel turns |
| UF | direction in which partitioned wheel turns |
| BR | direction of movement of infusion bags |

What is claimed is:

1. A device for stacking and packing groups of infusion bags, the device comprising:
    a first continually turning wheel with tongs that moves relative to the first wheel arranged on a side of the first wheel to grasp longitudinal sides of the infusion bag to be separated from a strand at a predetermined position by relative movement of the tongs to the first wheel; and
    a second partitioned wheel continually turning connected in a direction of conveyance which has receptacles for the infusion bags on an outer periphery, wherein a turning speed of the second wheel is less than a speed of the strand; and
    means for separating the strand.
2. The device in claim 1, wherein the tongs are swiveled in a direction in which the first wheel turns.
3. The device in claim 1, wherein the tongs are accelerated to produce the relative movement in a turning direction of the first wheel.
4. The device in claim 1, wherein the receptacles of the second wheel run radially to the second wheel.
5. The device in claim 1, further comprising a rail support which is arranged on a side of the second wheel, which when the second wheel turns, holds back the infusion bags deposited on the receptacles in the second wheel, so that they can be fed to a shaft.
6. The device in claim 5, further comprising a spiral conveyor arranged at least near one of the longitudinal sides of the infusion bags for transporting the infusion bags into the shaft.
7. The device in claim 6, wherein the spiral conveyor has a greater pitch in an area near the second wheel.
8. The device in claim 5, wherein the shaft is provided with shaking devices, by which the infusion bags stacked in the shaft are set in motion at periodic intervals.
9. The device in claim 5, further comprising a feeder that engages in the shaft to assemble a series of infusion bags with a predetermined number of infusion bags.
10. The device in claim 9, wherein the feeder rotates and moves continually.
11. The device in claim 9, wherein the feeder moves and oscillates linearly.

12. The device in claim 9, wherein the series of infusion bags can are put into a packing container by the feeder.

13. The device in claim 9, wherein the series of infusion bags can are fed to a pushing device by the feeder, wherein the series of infusion bags with a predetermined number of infusion bags are put into a packing container.

* * * * *